US011625659B2

(12) United States Patent
Pandey et al.

(10) Patent No.: US 11,625,659 B2
(45) Date of Patent: *Apr. 11, 2023

(54) SYSTEMS AND METHODS FOR PROACTIVE INFRASTRUCTURE RESOURCE MANAGEMENT FOR MULTIPLE APPLICATION CLUSTERS

(71) Applicant: Capital One Services, LLC, McLean, VA (US)

(72) Inventors: Amit Pandey, Plano, TX (US); Ateet Kumar Awasthi, McKinney, TX (US); Aaron L. Hoenig, Plano, TX (US); Kumar Anand, Plano, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 16 days.

This patent is subject to a terminal disclaimer.

(21) Appl. No.: 17/486,783

(22) Filed: Sep. 27, 2021

(65) Prior Publication Data

US 2022/0012662 A1 Jan. 13, 2022

Related U.S. Application Data

(63) Continuation of application No. 16/195,132, filed on Nov. 19, 2018, now Pat. No. 11,164,125.

(51) Int. Cl.
*G06Q 10/00* (2012.01)
*G06Q 10/0631* (2023.01)
(Continued)

(52) U.S. Cl.
CPC ......... *G06Q 10/06315* (2013.01); *G06F 9/46* (2013.01); *G06F 9/50* (2013.01);
(Continued)

(58) Field of Classification Search
CPC .. G06Q 10/06315; G06Q 10/00; G06Q 10/06; G06Q 10/067; G06F 9/50; G06F 9/46
(Continued)

(56) References Cited

U.S. PATENT DOCUMENTS 8,856,797 B1 10/2014 Siddiqui et al.
9,300,552 B2 * 3/2016 Dube ................. G06F 9/45558
(Continued)

FOREIGN PATENT DOCUMENTS

CA 2298266 A1 8/2000

*Primary Examiner* — Rutao Wu
*Assistant Examiner* — Tyrone E Singletary
(74) *Attorney, Agent, or Firm* — Troutman Pepper Hamilton Sanders LLP; Christopher J. Forstner; John A. Morrissett

(57) ABSTRACT

A system including: a processor; and a memory storing computer program code that controls the processor to: collect real-time business process metrics; collect real-time cluster metrics for a plurality of application clusters indicative of a required allotment of infrastructure resources for a given business process level; estimate a predicted future business process level; based on the estimated predicted future business process level and the real-time cluster metrics, predict a future infrastructure resource requirement of each of the plurality of application clusters; compare the predicted future infrastructure resource requirement of each of the plurality of application clusters to a current dedication of each of the plurality of application clusters; automatically adjust, in real-time and based on the comparison, respective allotments of infrastructure resources for each of the plurality of application clusters; receive an actual business process; and process the business process across the plurality of application clusters.

20 Claims, 4 Drawing Sheets

(51) Int. Cl.
 *G06Q 10/067* (2023.01)
 *G06F 9/50* (2006.01)
 *G06F 9/46* (2006.01)
 *G06Q 10/06* (2023.01)

(52) U.S. Cl.
 CPC ............ *G06Q 10/00* (2013.01); *G06Q 10/06* (2013.01); *G06Q 10/067* (2013.01)

(58) Field of Classification Search
 USPC ....................................................... 705/7.25
 See application file for complete search history.

(56) References Cited

U.S. PATENT DOCUMENTS

| | | | |
|---|---|---|---|
| 10,387,810 | B1 | 8/2019 | Kalush et al. |
| 2006/0248372 | A1 | 11/2006 | Aggarwal et al. |
| 2008/0195755 | A1 | 8/2008 | Lu et al. |
| 2013/0014107 | A1 | 1/2013 | Kirchhofer |
| 2013/0179895 | A1 | 7/2013 | Calder et al. |
| 2014/0282591 | A1 | 9/2014 | Stich et al. |
| 2017/0295107 | A1* | 10/2017 | Salapura .................... G06F 9/50 |
| 2018/0097744 | A1 | 4/2018 | Hu et al. |
| 2018/0260819 | A1 | 9/2018 | Bhatt et al. |
| 2019/0268278 | A1* | 8/2019 | Kaitha ................ H04L 65/1093 |

* cited by examiner

SYSTEMS AND METHODS FOR PROACTIVE INFRASTRUCTURE RESOURCE MANAGEMENT FOR MULTIPLE APPLICATION CLUSTERS

CROSS REFERENCE TO RELATED APPLICATIONS

This application is a continuation of, and claims priority under 35 U.S.C. § 120 to, U.S. patent application Ser. No. 16/195,132, filed Nov. 19, 2018, the entire contents of which is fully incorporated herein by reference.

FIELD

The disclosed technology generally relates to resource management, and, more particularly, systems and methods for proactive infrastructure resource management for multiple application clusters.

BACKGROUND

Cloud computing provides hosted services to users over a network (e.g., the Internet). A plurality of computer systems (such as servers) are provisioned to form a cloud, which allows hardware resources (e.g., processing power, data storage, bandwidth) to be shared between multiple services to optimize performance. Cloud computing may provide on-demand access to a shared pool of resources. However, as cloud-computing resource providers and management tools have become more common, a persistent issue has been the efficient scaling of resources. For example, if a virtualized application utilization is known, a sufficient, but not excessive, initial resource allocation may be provided. However, over time, application requirements may rise, requiring additional resources (e.g., faster processing power or a cluster of a plurality of small instances behind a load balancer), and fall creating wasted resources (e.g., because slower and/or less instances would satisfy the needs). The ability to provision and re-provision resources is thus a fundamental challenge of cloud computing as it allows one to 'right-scale' an application so that the resources upon which it is deployed match the computational demands it experiences. While reallocating resources reactively, in response to changed requirements, is known, reactive real-location creates either waste (because too many resources are assigned to a problem) or undesirable delay (because a user must wait for needed resources). Thus, proactively scaling resources is a persistent problem.

The task of right-scaling virtual resources is difficult in practice. Scaling an application based on instantaneous demand (e.g., autoscaling) is often an inappropriate resource-allocation scheme. Consequently, it is desirable to have a resource-provisioning plan that forecasting usage patterns and resource requirements. A related art approach of simply extending performance-metric time series (e.g., percent CPU utilization over time, disk IO over time, etc.) can be an expensive calculation, and does not well inform decisions to upgrade or downgrade a deployment. This problem may be exacerbated by the fact that performance patterns are often application-specific. That is, the way that an application performs on a resource is often very specific to that application, making it extremely difficult to predict how other applications will perform when deployed on different resource types. Moreover, these issues are compounded when a plurality of application clusters must be scaled simultaneously due to interweaved requirements.

Therefore, a need therefore exists for a more efficient way to proactively scale resource allocations for applications. Certain aspects of the present disclosure attempt to address these and other issues.

BRIEF SUMMARY

Certain disclosed embodiments provide systems and methods for proactive infrastructure resource management for multiple application clusters.

According to some embodiments, there is provided a system for predictive real-time scaling of a plurality of application clusters, the system including: at least one processor; and at least one memory having stored thereon computer program code that, when executed by the at least one processor, controls the processor to: collect real-time business process metrics; collect real-time cluster metrics for each of the plurality of application clusters indicative of a required allotment of infrastructure resources for a given business process level based on the real-time business process metrics; analyze the collected business process metrics to estimate a predicted future business process level; based on the estimated predicted future business process level and the real-time cluster metrics, predict a future infrastructure resource requirement of each of the plurality of application clusters; compare the predicted future infrastructure resource requirement of each of the plurality of application clusters to a current dedication of each of the plurality of application clusters; automatically adjust, in real-time and based on the comparison, respective allotments of infrastructure resources for each of the plurality of application clusters; receive an actual business process; and process the business process across the plurality of application clusters having adjusted respective allotments of infrastructure resources.

According to some embodiments, there is provided a system for predictive real-time scaling of a plurality of connected application clusters, the system including: at least one processor; and at least one memory having stored thereon computer program code that, when executed by the at least one processor, controls the processor to: collect real-time business process metrics; collect real-time cluster metrics of the plurality of connected application clusters correlated with the real-time business process metrics; analyze the collected business process metrics to estimate a predicted future business process level; based on the estimated predicted future business process level and the correlated real-time cluster metrics, predict a future requirement of each of the plurality of application clusters; compare the predicted future requirement of each of the plurality of application clusters to a current dedication of each of the plurality of application clusters; and automatically adjust, in real-time and based on the comparison, respective allotments of infrastructure resources each of the plurality of application clusters.

The automatically adjusting may be performed independently for each of the plurality of application clusters.

The predicted future requirement of each of the plurality of application clusters may be further based on historic cluster requirements for a given business process level.

A result of a first application cluster of the plurality of connected application clusters may be provided to a second application cluster of the plurality of connected application clusters.

Automatically adjusting the allotment of the second application cluster may be further based on the result flow from the first application cluster to the second application cluster.

Results of one or more of the plurality of application clusters may flow into other application clusters.

Automatically adjusting the respective allotments of each of the plurality of application clusters may be further based on the result flow from the one or more application clusters.

The business process level may correspond to an expected number of financial services applications. Each of the plurality of application clusters may include respective sets of mutually exclusive applications for processing financial services applications.

Analyzing the collected business process metrics to estimate the predicted future business process level may be based on at least one from among a time of day, a day of the week, and a time of year.

According to some embodiments, there is provided a method of predictive real-time scaling of a plurality of connected application clusters, the method including: collecting real-time business process metrics; collecting real-time cluster metrics of the plurality of connected application clusters correlated with the real-time business process metrics; analyzing the collected business process metrics to estimate a predicted future business process level; based on the estimated predicted future business process level and the correlated real-time cluster metrics, predicting a future requirement of each of the plurality of application clusters; comparing the predicted future requirement of each of the plurality of application clusters to a current dedication of each of the plurality of application clusters; and automatically adjusting, in real-time and based on the comparison, respective allotments of infrastructure resources for each of the plurality of application clusters.

The automatically adjusting may be performed independently for each of the plurality of application clusters.

The predicted future requirement of each of the plurality of application clusters may be further based on historic cluster requirements for a given business process level.

A result of a first application cluster of the plurality of connected application clusters may be provided to a second application cluster of the plurality of connected application clusters.

Automatically adjusting the allotment of the second application cluster may be further based on the result flow from the first application cluster to the second application cluster.

Results of one or more of the plurality of application clusters may flow into other application clusters.

Automatically adjusting the respective allotment of each of the plurality of application clusters may be further based on the result flow from the one or more application clusters.

The business process level may correspond to an expected number of financial services applications. Each of the plurality of application clusters may include respective sets of applications for processing financial services applications.

The business process level may correspond to an expected number of financial services applications. Each of the plurality of application clusters may include respective sets of mutually exclusive applications for processing financial services applications.

Analyzing the collected business process metrics to estimate the predicted future business process level may be based on at least one from among a time of day, a day of the week, and a time of year.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

According to some embodiments, there is provided systems and methods for proactive infrastructure resource management for multiple application clusters. For example, in some cases, a system correlates business process metrics with application cluster metrics. By analyzing the business metrics, the system predicts a future business process level and, based on the correlation, adjusts infrastructure allocation to the application clusters. The adjustment may be based, at least in part, of the workflow (e.g., connectiveness) of the application clusters. In some cases, infrastructure allocation for each application structure may be provided independently. When future business processes are received, the system processes the future business processes across the plurality of application clusters.

Reference will now be made in detail to example embodiments of the disclosed technology, examples of which are illustrated in the accompanying drawings and disclosed herein. Wherever convenient, the same references numbers will be used throughout the drawings to refer to the same or like parts.

Figure 1:
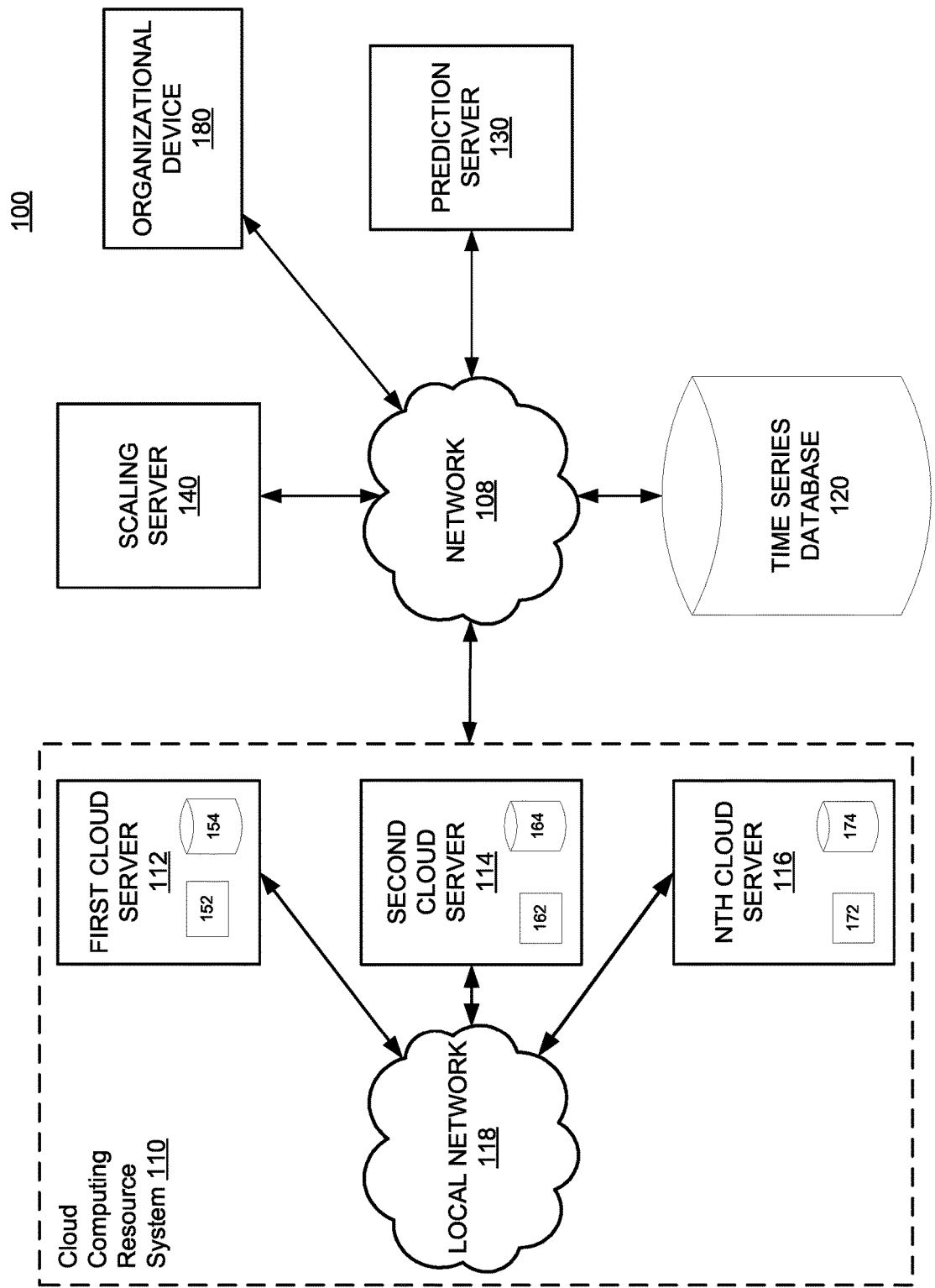
FIG. 1 is a diagram of an example system environment that may be used to implement one or more embodiments of the present disclosure.

FIG. 1 is a diagram of an example system environment that may be used to implement one or more embodiments of the present disclosure. The components and arrangements shown in FIG. 1 are not intended to limit the disclosed embodiments as the components used to implement the disclosed processes and features may vary.

In accordance with certain disclosed embodiments, system environment 100 may include a cloud computing resource system 110 in communication with a time series database 120, a prediction server 130, and a scaling server 140 via network 108. In some embodiments, cloud computing resource system 110 may also be in communication with various databases (e.g., proprietary databases) and devices (e.g., organizational device 180). Organizational device 180 may be a computing device, such as a mobile computing device (e.g., a smart phone, tablet computer, smart wearable device, portable laptop computer, voice command device, wearable augmented reality device, or other mobile computing device) or fixed computing device (e.g., desktop computer). An example architecture that may be used to implement one or more aspects of system environment 100 is described below with reference to FIG. 4.

Cloud computing resource system 110 may provide cloud computing services. For example, an organization (e.g., associated with organization device 180) may utilize cloud computing resource system 110 to execute a plurality of application clusters. Cloud computing resource system 110 may include a plurality of servers (112, 114, 116), which include respective processors (152, 162, 172) and memories (154, 165, 174). The plurality of servers 112, 114, 116 may be connected either directly, or through a network (e.g., local network 118). Local network 118 may be of any suitable type, including individual connections via the internet such as cellular or Wi-Fi networks. Each of the plurality of servers 112, 114, 116 may execute one or more application clusters of a plurality of application clusters. For example, first cloud server 112 may execute a first application cluster, second cloud server 114 may execute a second application cluster, and nth cloud server 116 may execute and nth application cluster. The application clusters may support business processes, and may implement respective sets of one or more applications. In some cases, cloud computing resource system 110 communicates with time series database 120 to provide business process and application cluster metrics. The business process and application cluster metrics may be collected and/or provided in real-time. Once the business process and application cluster metrics are processed (as discussed in more detail below), cloud computing resource system 110 may receive instructions to scale the application clusters, for example, from scaling server 140. In response, cloud computing resource system 110 may increase or decrease the allotment of resources (e.g., servers) executing the application clusters.

Time series database 120 may store business process metrics and application cluster metrics from cloud computing resource 120. Prediction server 130 may access the metrics stored in time series database 120, and execute a predictive analysis (e.g., through a RIDGE regressive algorithm) to predict future business process volume. In some cases, prediction server 130 may utilize machine learning or modeling to perform the prediction analysis. The predicted future business process volume may be stored in the time series database 120. Scaling server 140 may retrieve the predicted future business process volume and the current application cluster metrics from time series database 120. Scaling server 140 may compare the predicted future business process volume to current cluster metrics to determine whether the application clusters need to be scaled. In some cases, scaling server 140 may make the determination for each application cluster of the plurality of application clusters. In some instances, scaling server 140 may base the scaling decision at least partly by comparing current and predicted business process volume. For example, if a predicted business process volume if 5% greater than a current business process volume, scaling server 140 may determine (e.g., for each application cluster) whether current cluster scaling can accommodate a 5% increase in business process volume (e.g., by comparing current allocation to current utilization rates). In some cases, scaling server 140 may determine proportional relationships between business process volume and the plurality of application clusters. When the scaling decision is made, scaling server 140 may provide calls (e.g., API calls) to cloud computing resource system 110 to scale the application clusters.

Organizational device 180 may provide business processes to cloud computing resource system 110. The business processed may each be processed by a plurality of the plurality of application clusters. For instance, if the business processes relate to loan applications, each loan application may be processed in a plurality of application clusters, which may differ based on, for example, loan type (e.g., mortgage, car, personal, business, prime, subprime, refinance), loan originator (e.g., state, city, or branch), and loan recipient (e.g., business or person, age, credit score, residency). In some cases, the loans may be processed in a plurality of application clusters sequentially (e.g., one at a time), concurrently (e.g., processed all together, and/or recursively (e.g., where one application may be processed by a same one or more application clusters repeatedly as status changes based on the other application clusters). In some cases, each loan application may be processed in different application clusters based on, for example, the loan type, loan originator, and/or loan recipient. In some implementations loan applications of various types, originators, and/or recipients may be processed by one or more same application cluster, but may be processed by application logic, channels, and/or stages differently.

Network 108 may be of any suitable type, including individual connections via the internet such as cellular or Wi-Fi networks. In some embodiments, network 108 may connect terminals using direct connections such as radio-frequency identification (RFID), near-field communication (NFC), Bluetooth™, low-energy Bluetooth™ (BLE), Wi-Fi™, ZigBee™, ambient backscatter communications (ABC) protocols, USB, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

One of ordinary skill will recognize that various changes and modifications may be made to system environment 100 while remaining within the scope of the present disclosure. For example, in some cases prediction server 130 and/or scaling server 140 may be implemented in "serverless" forms (e.g., executed within cloud computing resource system 110). Moreover, while the various components have been discussed as distinct elements, this is merely an example, and, in some cases, various elements may be combined into one or more physical or logical systems.

Figure 2:
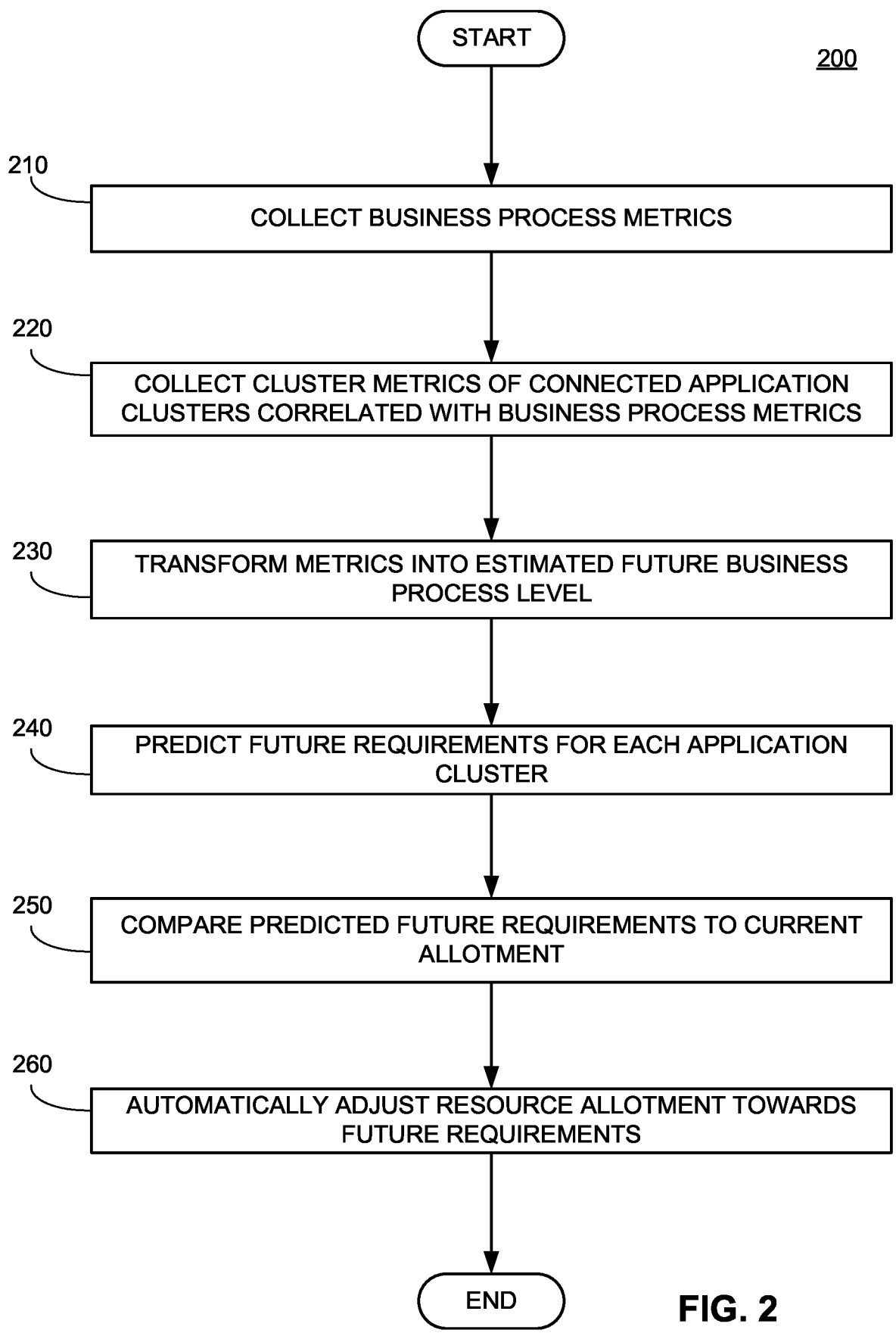
FIGS. 2 and 3 are flowcharts of one or more methods according to certain example embodiments.

FIG. 2 is a flowchart 200 of a resource management method according to an example embodiment. Referring to FIG. 2, a system (e.g., cloud computing resource system 110) collects 210 business process metrics. For example, cloud computing resource system 110 may capture business process inputs from organizational device 180. The system (e.g., cloud computing resource system 110) collects 220 cluster metrics of connected application clusters. The business process metrics and application cluster metrics may be correlated. For example, cloud computing resource system 110 may track cluster metrics as a function of input business processes. As non-limiting examples, the correlation may be based on business process volume, business process type, and current cluster resource allocation and/or requirements. Cloud computing resource system 110 may store the business process metrics and application cluster metrics in time series database 120.

The system transforms 230 the collected business process metrics into an estimated future business process level. For example, prediction server 130 may access historical business process metrics stored in time series database 120 to estimate a future business process level. In some cases, prediction server 130 may run the collected business process metrics through a machine learning model to estimate future business process levels. Certain implementations may utilize one or more ridge algorithms (e.g., ridge regression using cross validation). In some cases, the estimate may for a plurality of intervals (e.g., 10-minute intervals) and/or on a rolling basis (e.g., predicting over the next 10 minutes). Prediction server 130 may store the predicted business process level in time series database 120. In some cases, the predictions are compared to actual business process levels, and the prediction algorithm may be tuned based thereon. The predicted business process level may be based on feature mapping using data points within the metrics including at least one from among a time of day, day of the week, day of the month, time of year, as well as specific days that may impact application volume such as holidays, pay days, and/or tax days).

The system predicts 240 future resource requirements for each of application cluster based on the predicted business process level. For example, scaling server 140 may access historical and current business process and application cluster metrics stored in time series database 120 along with the estimated a future business process level. Based on the historical and current business process and application cluster metrics, scaling server 140 may determine a correlation between business process levels and resource requirements for the application clusters. This correlation may be applied to the estimated future business process level to determine the future resource requirements for each application cluster. For example, a business process level over time may be associated with cluster requirements. In some cases, the correlation may change overtime (e.g., as different mixes of business processes are processed by the application system), and the system may repeatedly determine the correlation. In some instances, the business process level may require different application clusters at different points in time (e.g., as a business process is worked through a plurality of application clusters). For example, various application clusters may have different throughputs, and, combined with the time delay, scaling the plurality of application clusters may present significant challenges. Certain aspects of the present disclosure enable automatic, predictive scaling of the plurality of application clusters taking into account the time delays and individual cluster throughput. In certain cases, the business process level may be resolved into subgroups of different types of business processes. As a non-limiting example, the business process level may correspond to an expected number of financial services applications (e.g., loan applications). Each of the application clusters may include one or more mutually exclusive applications for processing the financial services applications. In certain cases, the correlation between business levels and application cluster resource requirements may change circumstantially (e.g., time of day) based on predicted changes to business process mix.

The system (e.g., scaling server 140) compares 250 the predicted future resource requirements with a current resource allotment for each application cluster and automatically adjusts 260 resource allocation for the application clusters towards the predicted future resource requirements. For example, if scaling server 140 identifies an application cluster whose current allocation is less than the predicted future resource requirements, scaling server 140 may send a command to the cloud computing resource system 110 to increase resource allocation for the identified cluster. In some cases, the automatic adjustment 260 may be performed independently for each of the plurality of application clusters. In some cases, results of one application cluster may feed into a second application cluster. Accordingly, resource requirements for the second application cluster may be are least partially based on the result flow from the first application cluster. Further, in some cases, the resource requirements for the second application cluster may be predicted to be delayed compared the first application cluster.

Figure 3:
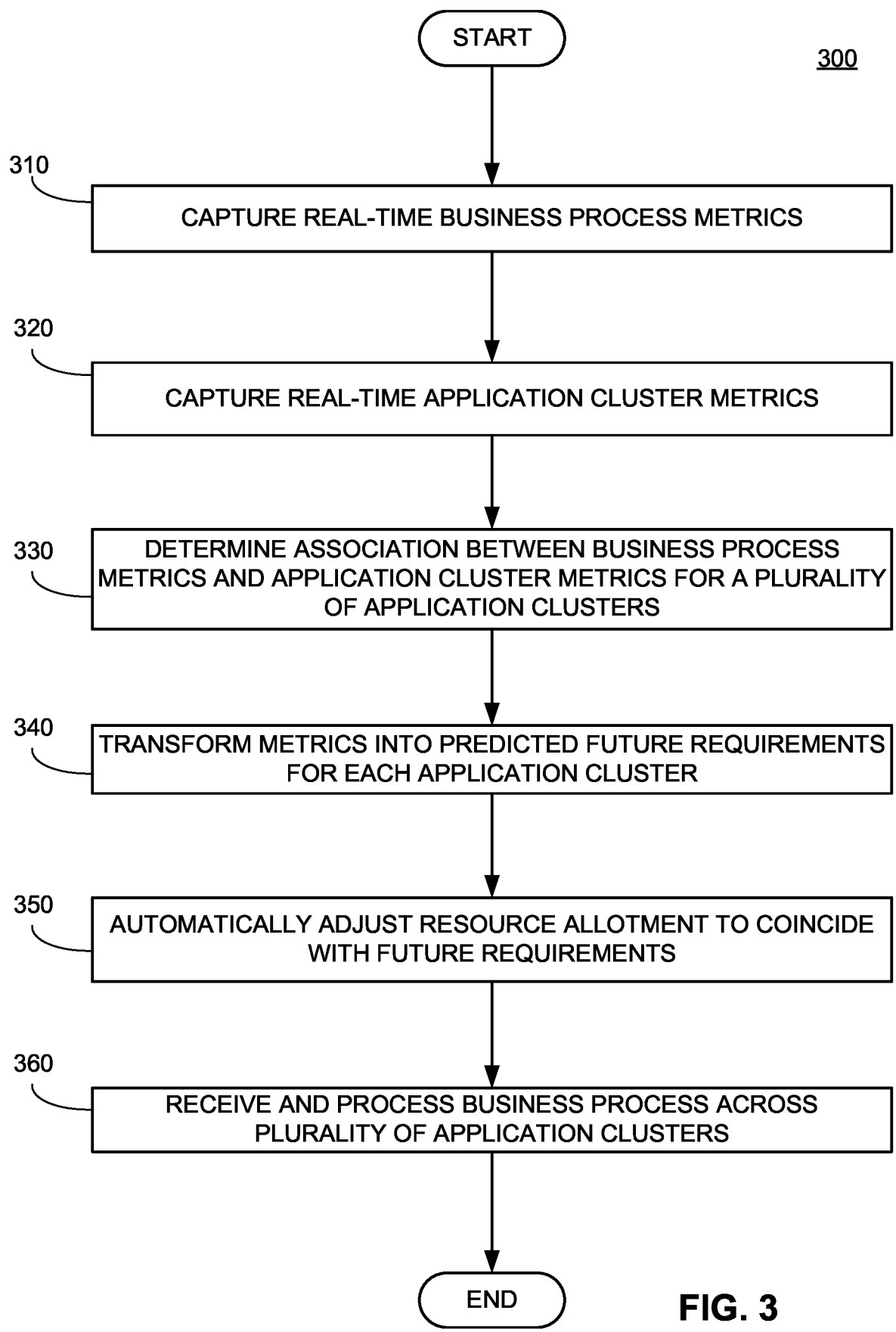

FIG. 3 is a flowchart 300 of a resource management method according to an example embodiment. Referring to FIG. 3, a system (e.g., cloud computing resource system 110) captures 310 business process metrics (e.g., real-time business process metrics) and captures 320 real-time application cluster metrics. For example, cloud computing resource system 110 may capture 310 business process inputs from organizational device 180, and track corresponding application cluster metrics indicative of a required allotment of infrastructure resources for the business process level. Based on the captured metrics, the system determines 330 an association between the business process metrics and the application cluster metrics for a plurality of application clusters. For example, by analyzing the real-time business process metrics in combination with the real-time application cluster metrics, the system may determine cluster requirements for a given business process level.

The system transforms 340 the business process and application cluster metrics into predicted future resource requirements for each application cluster. For instance, based on historic and the real-time business process metrics, the system may estimate a future business level (e.g., as discussed above with reference to 230 of FIG. 2). Based on the predicted future business process level and the determined association between business process levels and application cluster metrics, the system translates the estimate into predicted resource requirements for each application cluster (e.g., as discussed above with reference to 240 of FIG. 2).

The system automatically adjusts 350 resource allotments to the application clusters based on the predicted future resource requirements. For example, the system may compare the predicted future infrastructure resource requirements of each of the plurality of application clusters to a current dedication of each of the plurality of application clusters. Scaling server 140 may transmit a command to cloud computing resource system 110 to control the adjustment of the resource allotment to substantially coincide with the prediction.

At the future date, the system receives actual business process (e.g., from organizational device 180), and processes 360 the business process across the plurality of application clusters. The system may then capture 310/320 the actual business process level and metrics for the application clusters, compute a new estimated future business process level 340, and adjust 350 the resource allotments (e.g., repeatedly). In some cases, differences between the predicted business process levels and/or estimated resource requirements may be compared to actual business process levels and/or actual resource requirements. The comparison may be used to augment or tune to transforming 340.

Figure 4:
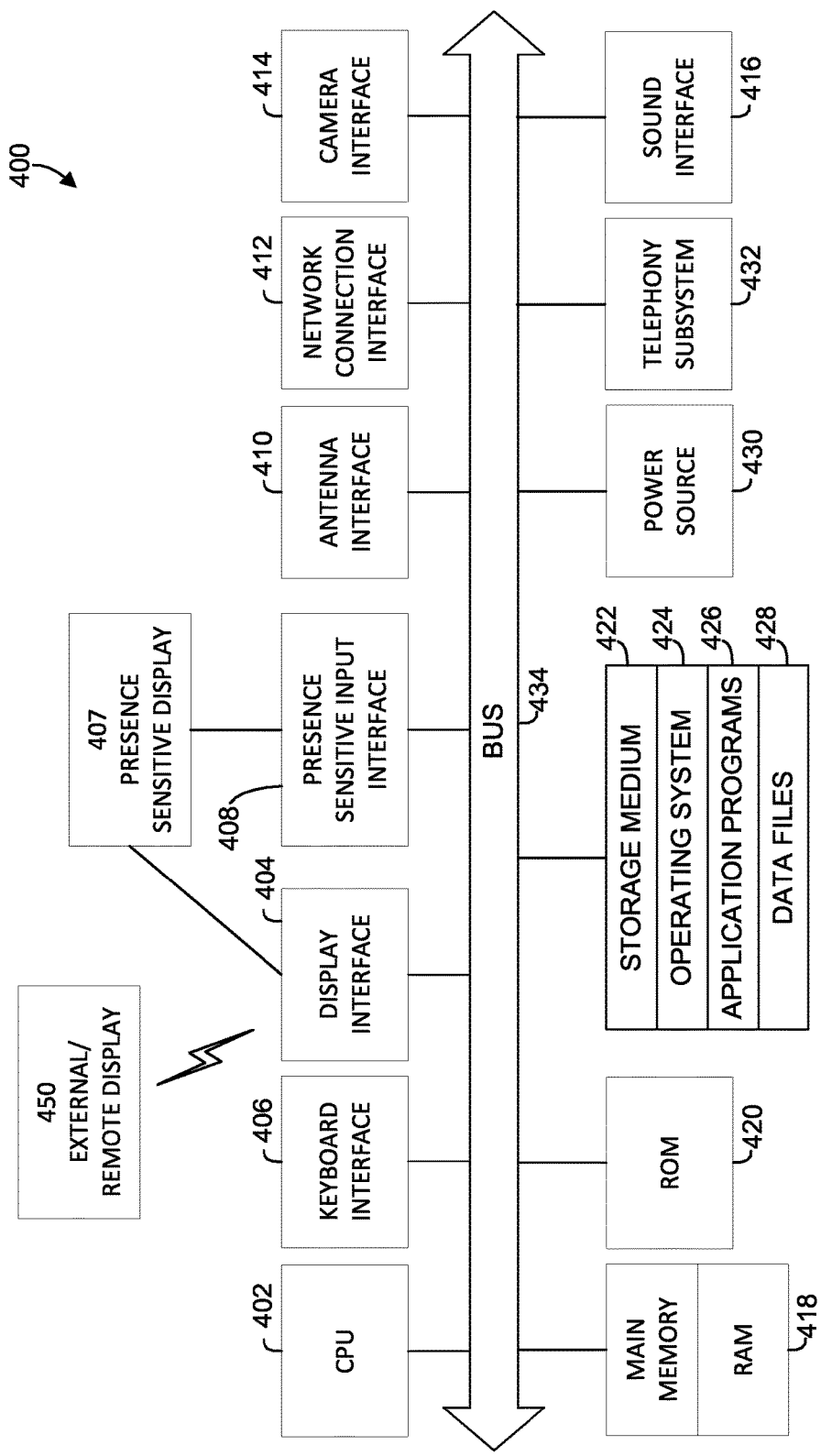
FIG. 4 is a block diagram of a computer architecture according to an example embodiment.

FIG. 4 is a block diagram of an illustrative computing device architecture 400, according to an example implementation. The computing device architecture 400 may be used to implement certain aspects of the present disclosure and/or one or more components for executing the present disclosure according to some example embodiments. For example, computing device architecture 400 may be used to implement one or more of cloud computing resource system 110, first cloud server 112, second cloud server 114, nth cloud server 116, time series database 120, prediction server 130, scaling server 140, and/or organizational device 180. It will be understood that the computing device architecture 400 is provided for example purposes only and does not limit the scope of the various implementations of the present disclosure. In some embodiments, various systems and/or components have fewer, alternative, or additional components as that illustrated in FIG. 4.

The computing device architecture 400 of FIG. 4 includes a central processing unit (CPU) 402, where computer instructions are processed, a display interface 404 that acts as a communication interface and provides functions for rendering video, graphics, images, and texts on the display. In certain example implementations of the disclosed technology, the display interface 404 may be directly connected to a local display, such as a touch-screen display associated with a mobile computing device. In another example implementation, the display interface 404 may be configured for providing data, images, and other information for an external/remote display 450 that is not necessarily physically connected to the mobile computing device. For example, a desktop monitor may be used for mirroring graphics and other information that is presented on a mobile computing device. In certain example implementations, the display interface 404 may wirelessly communicate, for example, via a Wi-Fi channel or other available network connection interface 412 to the external/remote display 450.

In an example implementation, the network connection interface 412 may be configured as a communication interface and may provide functions for digital virtual assistant using voice, rendering video, graphics, images, text, other information, or any combination thereof on the display. In one example, a communication interface may include a microphone, camera, serial port, a parallel port, a general-purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 404 may be operatively coupled to a local display, such as a touch-screen display associated with a mobile device or voice enabled device. In another example, the display interface 404 may be configured to provide video, graphics, images, text, other information, or any combination thereof for an external/remote display 450 that is not necessarily connected to the mobile computing device. In one example, a desktop monitor may be used for mirroring or extending graphical information that may be presented on a mobile device. In another example, the display interface 404 may wirelessly communicate, for example, via the network connection interface 412 such as a Wi-Fi transceiver to the external/remote display 450.

The computing device architecture 400 may include a keyboard interface 406 that provides a communication interface to a keyboard. In one example implementation, the computing device architecture 400 may include a presence sensitive input interface 408 for connecting to a presence sensitive display 407. According to certain example implementations of the disclosed technology, the presence sensitive input interface 408 may provide a communication interface to various devices such as a pointing device, a touch screen, a depth camera, microphone, etc. which may or may not be associated with a display.

The computing device architecture 400 may be configured to use an input device via one or more of input/output interfaces (for example, the keyboard interface 406, the display interface 404, the presence sensitive input interface 408, network connection interface 412, camera interface 414, sound interface 416, etc.) to allow a user to capture information into the computing device architecture 400. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 400 or may be a separate device. For example, the input device may be an accelerometer, a magnetometer, a digital camera, a microphone, and an optical sensor.

Example implementations of the computing device architecture 400 may include an antenna interface 410 that provides a communication interface to an antenna; a network connection interface 412 that provides a communication interface to a network. As mentioned above, the display interface 404 may be in communication with the network connection interface 412, for example, to provide information for display on a remote display that is not directly connected or attached to the system. In certain implementations, camera interface 414 acts as a communication interface and provides functions for capturing digital images from a camera. In certain implementations, a sound interface 416 is provided as a communication interface for converting sound into electrical signals using a microphone and for converting electrical signals into sound using a speaker. According to example implementations, a random-access memory (RAM) 418 is provided, where computer instructions and data may be stored in a volatile memory device for processing by the CPU 402.

According to an example implementation, the computing device architecture 400 includes a read-only memory (ROM) 420 where invariant low-level system code or data for basic system functions such as basic input and output (I/O), startup, or reception of keystrokes from a keyboard are stored in a non-volatile memory device. According to an example implementation, the computing device architecture 400 includes a storage medium 422 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 424, application programs 426 (including, for example, a web browser application, a widget or gadget engine, and or other applications, as necessary) and data files 428 are stored. According to an example implementation, the computing device architecture 400 includes a power source 430 that provides an appropriate alternating current (AC) or direct current (DC) to power components.

According to an example implementation, the computing device architecture 400 includes a telephony subsystem 432 that allows the computing device to transmit and receive sound over a telephone network. The constituent devices and the CPU 402 communicate with each other over a bus 434.

According to an example implementation, the CPU 402 has appropriate structure to be a computer processor. In one arrangement, the CPU 402 may include more than one processing unit. The RAM 418 interfaces with the computer BUS 434 to provide quick RAM storage to the CPU 402 during the execution of software programs such as the operating system application programs, and device drivers. More specifically, the CPU 402 loads computer-executable process steps from the storage medium 422 or other media into a field of the RAM 418 to execute software programs. Data may be stored in the RAM 418, where the data may be accessed by the computer CPU 402 during execution.

The storage medium 422 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 422, which may include a machine-readable storage medium.

According to one example implementation, the term computing device, as used herein, may be a CPU, or conceptualized as a CPU (for example, the CPU 402 of FIG. 4). In this example implementation, the computing device (CPU) may be coupled, connected, and/or in communication with one or more peripheral devices, such as display. In another example implementation, the term computing device, as used herein, may refer to a mobile computing device such as a smart phone, tablet computer, or smart watch. In this example implementation, the computing device may output content to its local display and/or speaker(s). In another example implementation, the computing device may output content to an external display device (e.g., over Wi-Fi) such as a TV or an external computing system.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones.

Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Example Use Cases

The following example use cases describe examples of a use of systems and methods for automatically adjusting resource allocations to a plurality of application in clusters using predictive real-time scaling. These examples use cases are intended solely for explanatory purposes and not for limitation. In one case, an organization wishes to efficiently utilize cloud computing resources. Accordingly, business processes are processed in a plurality of cloud-based application clusters. Over time, business level metrics and application cluster metrics are captured. Eventually, using machine-learning models, the organization can predict business process levels in the near future based on current and recent business levels, along with historical trend information. The organization may transform this prediction into predicted future application cluster resource requirements by identifying correlations between business process levels and application cluster use. The organization may then automatically adjust, in real-time, resource allocations based on the precited future requirements.

In one case, the organization may be a financial services provider. The business processes may be loan applications, and the application clusters may be respective applications used to process loan applications. Based on a certain mix of loans (e.g., loan type), different application cluster scales may be needed. The system identifies a correlation, predicts future loan application levels, and determines application cluster requirements for the predicted loan application level. The system then adjusts the application clusters to meet the predicted requirements.

What is claimed is:

1. A system for predictive real-time scaling of a plurality of connected application clusters, the system comprising:
one or more processors;
a memory having stored thereon instructions that, when executed by the one or more processors, causes the system to:
perform, with the plurality of connected application clusters, one or more business processes, wherein the one or more business processes are associated with loan applications;
collect real-time business process metrics from the plurality of connected application clusters, wherein the real-time business process metrics comprise a volume of loan applications processed by the plurality of connected application clusters;
retrieve, from a time series database, real-time cluster metrics for the plurality of connected application clusters based on the volume of loan applications processed by the plurality of connected application clusters;
correlate the real-time cluster metrics with the volume of loan applications processed by the plurality of connected application clusters;
analyze the business process metrics to estimate a predicted future business process level using one or more machine learning algorithms by estimating a future volume of loan applications to be processed by the plurality of connected application clusters;

predict a future requirement of each of the plurality of connected application clusters based on the future business process level and the correlated real-time cluster metrics;

compare the future requirement of each of the plurality of connected application clusters to a current usage of each of the plurality of connected application clusters to identify a first application cluster for which the current usage is below the future requirement; and automatically adjust, in real-time and based on the comparison, a first allotment of infrastructure resources assigned to the first application cluster.

2. The system of claim 1, wherein the one or more machine learning algorithms are configured to perform ridge regression using cross validation on the time series database.

3. The system of claim 1, wherein the memory stores instructions, that when executed by the one or more processors, are configured to cause the system to:

calculate a time delay between adjusting the first allotment and adjusting a second allotment of infrastructure resources assigned to a second application cluster;

predict a new future business process level based on the calculated time delay; and compare the new future business process level of the second application cluster to a current dedication of the second application cluster.

4. The system of claim 1, wherein the predicted future requirement of each of the plurality of connected application clusters is further based on historic cluster requirements for a given business process level.

5. The system of claim 3, wherein automatically adjusting a first allotment of infrastructure resources assigned to the first application cluster and automatically adjusting a second allotment of infrastructure resources assigned to the second application cluster further comprises executing an API call to a respective application cluster to adjust an allotment of infrastructure resources.

6. The system of claim 1, wherein each of the plurality of connected application clusters is associated with different types of loan applications.

7. The system of claim 6, wherein each of the different types of loan applications comprise a loan type selected from a mortgage loan, a car loan, a personal loan, a business loan, a prime loan, a subprime loan, or a refinance loan.

8. The system of claim 1, wherein
the business process level corresponds to an expected number of financial services applications, and
each of the plurality of connected application clusters comprise respective sets of mutually exclusive applications for processing financial services applications.

9. The system of claim 1, wherein analyzing the business process metrics to estimate the predicted future business process level is based on at least one from among a time of day, a day of the week, and a time of year.

10. A method of predictive real-time scaling of a plurality of connected application clusters, the method comprising:

performing, with the plurality of connected application clusters, one or more business processes, wherein the one or more business processes are associated with loan applications;

collecting real-time business process metrics from the plurality of connected application clusters, wherein the real-time business process metrics comprise a volume of loan applications processed by the plurality of connected application clusters;

collecting real-time cluster metrics of the plurality of connected application clusters based on the volume of loan applications processed by the plurality of connected application clusters;

correlating the real-time cluster metrics with the volume of loan applications processed by the plurality of connected application clusters;

analyzing the collected real-time business process metrics to estimate a predicted future volume of loan applications to be processed by the plurality of connected application clusters;

predicting a future requirement of each of the plurality of connected application clusters based on the predicted future volume of loan applications and the correlated real-time cluster metrics;

comparing the predicted future requirement of each of the plurality of connected application clusters to a current usage of each of the plurality of connected application clusters; and automatically adjusting, in real-time and based on the comparison, a first allotment of infrastructure resources allocated to a first application cluster.

11. The method of claim 10, wherein the analyzing comprises one or more machine learning algorithms configured to perform ridge regression using cross validation.

12. The method of claim 10, wherein the predicted future requirement of each of the plurality of connected application clusters is further based on historic cluster requirements for a given volume of loan applications.

13. The method of claim 10, further comprising automatically adjusting a second allotment to a second application cluster based on the comparison and the first allotment, wherein automatically adjusting the first allotment and the second allotment is performed independently for each of the plurality of connected application clusters.

14. The method of claim 10, further comprising comparing the predicted future requirement of each of the plurality of connected application clusters to an actual volume of loan applications processed by the plurality of connected application clusters to tune one or more machine learning algorithms.

15. The method of claim 13, wherein automatically adjusting a first allotment of infrastructure resources assigned to the first application cluster and automatically adjusting a second allotment of infrastructure resources assigned to the second application cluster further comprises executing, by a scaling server, an API call to a respective application cluster to adjust an allotment of infrastructure resources.

16. The method of claim 10, wherein each of the plurality of connected application clusters is associated with different types of loan application.

17. The method of claim 16, wherein each of the different types of loan applications comprise a loan type selected from a mortgage loan, a car loan, a personal loan, a business loan, a prime loan, a subprime loan, or a refinance loan.

18. The method of claim 11, wherein
the predicted future volume of loan applications corresponds to an expected number of financial services applications, and
each of the plurality of connected application clusters comprise respective sets of applications for processing financial services applications.

19. The method of claim 18, wherein
the respective sets of applications are mutually exclusive applications for processing financial services applications.

20. The method of claim 11, wherein analyzing the collected real-time business process metrics to estimate the predicted future volume of loan applications is based on at least one from among a time of day, a day of the week, and a time of year.

* * * * *